(12) United States Patent
Kosai et al.

(10) Patent No.: US 6,177,212 B1
(45) Date of Patent: Jan. 23, 2001

(54) VALVE-REGULATED LEAD-ACID BATTERY

(75) Inventors: Masahiko Kosai; Akira Kamada, both of Kyoto (JP)

(73) Assignee: Japan Storage Battery Co., Ltd., Kyoto (JP)

( * ) Notice: Under 35 U.S.C. 154(b), the term of this patent shall be extended for 0 days.

(21) Appl. No.: 09/118,001

(22) Filed: Jul. 17, 1998

(51) Int. Cl.$^7$ ............................... H01M 4/16; H01M 4/62
(52) U.S. Cl. ........................................... 429/212; 429/225
(58) Field of Search .................... 429/225, 212, 429/217

(56) References Cited

U.S. PATENT DOCUMENTS

| | | | |
|---|---|---|---|
| 4,252,877 | * 2/1981 | Bowser | 429/212 |
| 4,888,259 | * 12/1989 | Ebner | 429/217 |
| 5,403,462 | * 4/1995 | Lev | 204/403 |
| 5,558,960 | 9/1996 | Mitchell . | |
| 5,656,393 | * 8/1997 | Boer | 429/217 |

FOREIGN PATENT DOCUMENTS

| | | |
|---|---|---|
| 0 055 888 | 7/1982 | (EP) . |
| 0 680 105 | 11/1995 | (EP) . |
| 1 283 217 | 7/1972 | (GB) . |
| 48000994 | * 2/1973 | (JP) . |
| 405325948 | * 12/1993 | (JP) ................................ H01M/4/02 |

* cited by examiner

*Primary Examiner*—Carol Chaney
*Assistant Examiner*—Mark Ruthkosky
(74) *Attorney, Agent, or Firm*—Sughrue, Mion, Zinn, Macpeak & Seas, PLLC

(57) ABSTRACT

A valve-regulated lead-acid battery produced by a so-called container formation method including preparing a battery from unformed positive and negative plates filling a predetermined dilute sulfuric acid into said battery, and then applying an electric current to said battery so that the group of plates is formed by container formation is provided. The valve-regulated lead-acid battery has an negative active material containing an oil incorporated therein. The amount of the oil to be incorporated is from 0.05 to 1% by weight. The oil may be a paraffinic oil, naphthenic oil, olefinic oil, aromatic oil or silicon-based oil.

2 Claims, No Drawings

VALVE-REGULATED LEAD-ACID BATTERY

BACKGROUND OF THE INVENTION

1. Field of the Invention

The present invention relates to the improvement of a method for producing a valve-regulated lead-acid battery.

2. Description of the Related Art

In order to cope with the recent development of multimedia system, infrastructural improvements in the optical communication network corresponding thereto have been progressing rapidly. An optical communication fiber system is capable of communicating a large amount of data but requires the conversion of optical signal to electrical signal at connecting points. The optoelectronic converter used for this purpose cannot operate without backup power supply against power failure. These converters are mostly used outdoors. Thus, this type of a valve-regulated lead-acid battery used as backup power supply is exposed to very severe temperature atmosphere. In particular, in a high temperature atmosphere in summer time, the storage battery is liable to "dry-up" or "thermal-runaway" due to decomposition of the electrolyte during float charging and thus exhibits impaired battery properties.

The foregoing dry-up which occurs during float charging is a phenomenon in which decomposition causes the electrolyte to lose water content, reducing the discharge capacity of the battery. The foregoing thermal-runaway is a phenomenon in which the rise in temperature is accompanied by the rise in charging current that causes abnormal heat generation of the battery, eventually resulting in dry-up that disables the battery. These phenomena, particularly thermal-runaway, can easily occur when the battery is used at a temperature as high as not lower than 60° C. over an extended period of time. When the battery is used at a temperature as high as not lower than 70° C., these phenomena can occur even in a short period of time. It has thus been desired to develop a battery which can be used in such severe conditions.

The valve-regulated lead-acid battery which is little liable to these phenomena is a battery which shows little rise in float charging current even when used at high temperatures. Such a battery cannot be obtained by the conventional art.

The rise in charging current accompanying the temperature rise is a synergism of the rise in the amount of oxygen produced at the positive electrode by the decomposition of the electrolyte with the rise in the oxygen absorption reaction rate at the negative electrode accompanying the enhancement of the oxygen recombination reaction rate. When the rate of generation of Joule heat accompanying the rise in the reaction heat and charging current becomes greater than the rate of heat dissipation from the battery, the battery temperature rises beyond the ambient temperature. The rise in the battery temperature causes a further rise in charging current that causes a further rise in the battery temperature. Thus, a vicious circle arises, eventually resulting in thermal-runaway.

SUMMARY OF THE INVENTION

It is an object of the present invention to provide a valve-regulated lead-acid battery which hardly occurs thermal-runaway even if it is used at high temperatures.

The present invention provides a valve-regulated lead-acid battery produced by a so-called container formation method which comprises the steps of: preparing a battery from unformed positive and negative plates, filling a predetermined dilute sulfuric acid into said battery, and then applying an electric current to said battery so that the group of plates is formed in a battery case, wherein a negative active material comprising an oil incorporated therein is used. In accordance with the present invention, a valve-regulated lead-acid battery having stable battery properties which shows no rise in float charging current even at high temperatures can be provided.

According to the present invention, a valve-regulated lead-acid battery having stable battery properties which shows no rise in float charging current even At high temperatures can be provided.

DETAILED DESCRIPTION OF THE INVENTION

Detailed description of the present invention will be described as follows.

The valve-regulated lead-acid battery according to the prevent invention concerns a valve-regulated lead-acid battery produced by a so-called container formation method which having the steps of preparing a battery from unformed positive and negative plates, filling a predetermined dilute sulfuric acid into said battery, and then applying an electric current to said battery so that the group of plates in formed in a battery case, wherein an negative active material comprising an oil incorporated therein is used. The addition of the oil is effected during the kneading of the negative electrode paste. The amount of the oil to be incorporated is preferably from 0.05 to 1% by weight. Referring to the kind of the oil to be used, animal oils and vegetable oils may be used. However, paraffinic oils, naphthenic oils, olefinic oils, aromatic oils and silicon-based oils are preferably used. Commercially available oils contains various additives incorporated therein. Oils comprising ordinary lubricants and corrosion inhibitors incorporated therein in a proper amount may be used.

EXAMPLES

The present invention will be further described in the following examples.

Positive and negative grids made of a Pb-Ca-Sn alloy were filled with positive and negative pastes for lead storage battery, respectively, which were then cured and dried to obtain unformed positive and negative plates. The negative paste used was prepared in the following manner. Incidentally, the alloy used for the positive and negative grids are not particularly limited. However, Pb-Ca-Sn alloy, Pb-Ca alloy, Pb-Sn alloy, Pb alloy (Sb-free) and the like is preferably used as the negative plates. For the positive grids, the above alloys used for the negative grids is preferably used, and also, the above alloys slightly containing Sb such as Pb-Sb, Pb-Sb-Sn alloy can be used.

To a ball-milled leady oxide, barium sulfate, lignin sulfonic acid and carbon black are added in a proper amount. The mixture was then dry-mixed. Then, a predetermined amount of water and dilute sulfuric acid having a specific gravity of 1.4 are sequentially added to the mixture. The mixture was then kneaded. The amount of barium sulfate, lignin sulfonic acid and carbon black to be incorporated may be from 0.1 to 2%, from 0.05 to 1% and from 0.05 to 2%, respectively. Thereafter, to the paste was added an oil in an amount of from 0 to 1.5%. The mixture was then kneaded to prepare seven kinds of pastes as set forth in Table 1.

TABLE 1

| Negative plate | Added amount of oil (%) |
| --- | --- |
| A | 0 |
| B | 0.05 |
| C | 0.1 |
| D | 0.2 |
| E | 0.5 |
| F | 1 |
| G | 1.5 |

These positive and negative plates were then assembled into batteries. A predetermined amount of dilute sulfuric acid was then filled into the batteries. These plates were then formed in a battery case to obtain Nos. 1 to 7 retainer type valve-regulated lead-acid batteries as set forth in Table 2. At the same time, for comparison, the same unformed positive and negative plates as used above were formed by tank formation method in sulfuric acid having a specific gravity of 1.05, rinsed, and then dried to obtain formed plates. These formed plates were then assembled into batteries. A predetermined dilute sulfuric acid was then filled into the batteries. These batteries were then initially charged to prepare Nos. 7 to 12 batteries as set forth in Table 2.

TABLE 2

| Battery No. | Negative grid | Added amount of oil (%) | Formation method | Remarks |
| --- | --- | --- | --- | --- |
| 1 | A | 0 | Container formation | Comparative Example |
| 2 | B | 0.05 | | Present invention |
| 3 | C | 0.1 | | |
| 4 | D | 0.2 | | |
| 5 | E | 0.5 | | |
| 6 | F | 1 | | |
| 7 | G | 1.5 | | Comparative Example |
| 8 | A | 0 | Tank formation | |
| 9 | B | 0.05 | Tank formation | |
| 10 | C | 0.1 | Tank formation | |
| 11 | D | 0.2 | Tank formation | |
| 12 | E | 0.5 | Tank formation | |
| 13 | F | 1 | Tank formation | |
| 14 | G | 1.5 | Tank formation | |

All these batteries were stationary valve-regulated lead-acid batteries having a nominal capacity of 38 Ah (20 hour rate) and a nominal voltage of 2 V.

These batteries were the measured for 20 hR (hour rate) discharge capacity and high rate (38 A) discharge capacity. These batteries were then subjected to thermal-runaway test. For thermal-runaway test, these batteries were each subjected to constant voltage charging at various ambient temperatures. During this charging process, charging current and battery temperature were measured. When the battery temperature became 10° C. higher than the ambient temperature as a result of heat generation accompanying the instabilization and gradual rise in charging current during constant voltage charging, thermal-runaway state was judged to occur. The test was then terminated. The charging voltage was 2.275 V/battery, which is the same as used in float charging. The ambient temperature was initially 60° C. Thereafter, the ambient temperature was increased by 2.5° C. The testing period was 1 week for each ambient temperature.

Table 3 shows the 20 hR discharge capacity (25° C.) and high rate discharge capacity (25° C.) of these batteries and the ambient temperature (thermal-runaway temperature) at which these batteries show thermal-runaway. There is no big difference between 20 hR discharge capacity and high rate discharge capacity so far as the oil content is not more than 1% regardless of whether formation is effected in battery container or in tank. However, the greater the oil content is, the greater is the drop in high rate discharge capacity in particular. Therefore, it is thought undesirable to raise the oil content from 1%. Nos. 2 to 7 batteries having an oil incorporated therein in an amount of not less than 0.05% exhibit a thermal-runaway temperature of not lower than 77.5° C. and hence an excellent thermal-runaway resistance an compared with the comparative examples.

TABLE 3

| No. | Added amount of oil (%) | Formation method | Remarks | 20 hR discharge capacity (Ah) | High rate discharge capacity (Ah) | Thermal runaway temp. (° C.) |
| --- | --- | --- | --- | --- | --- | --- |
| 1 | 0 | Container formation | Comparative Example | 39.2 | 26.5 | 67.5 |
| 2 | 0.05 | | Example | 39.2 | 26.5 | 77.5 |
| 3 | 0.1 | | | 39.1 | 26.4 | 80.0 |
| 4 | 0.2 | | | 39.0 | 25.8 | 82.5 |
| 5 | 0.5 | | | 38.8 | 24.9 | 85.0 |
| 6 | 1 | | | 38.1 | 22.1 | 87.5 |
| 7 | 1.5 | | Comparative | 37.8 | 17.3 | 87.5 |
| 8 | 0 | Tank formation | Comparative | 36.4 | 25.4 | 70.0 |
| 9 | 0.05 | | Example | 38.2 | 25.2 | 72.5 |
| 10 | 0.1 | | | 37.6 | 25.0 | 72.5 |
| 11 | 0.2 | | | 37.5 | 24.4 | 75.0 |
| 12 | 0.5 | | | 37.1 | 23.5 | 75.0 |
| 13 | 1 | | | 35.7 | 20.9 | 75.0 |
| 14 | 1.5 | | | 35.5 | 15.4 | 75.0 |

The reason why the incorporation of an oil in the negative active material provides an improvement in thermal-runaway resistance is probably because the formation of an oil film on the active material makes it difficult to cause redox reaction and hence inhibit the rise in charging current at high temperatures.

Nos. 9 to 14 batteries having plates formed in the tank and having an oil incorporated therein exhibit a low thermal-runaway temperature as compared with the examples according to the present invention. This is probably because the oil is partially released from the negative active material during formation taking into account the fact that carbon black which has adsorbed the oil is observed suspended in the electrolyte after the formation in the tank.

The oil used herein is a commercially available mechanic oil containing various additives incorporated in a paraffinic hydrocarbon base oil. Referring to the kind of the oil to be used, animal oils and vegetable oils may be used. However, so-called petroleum oils such as paraffinic oil, naphthenic oil and olefinic oil excellent in acid resistance may be preferably used. Besides these kinds of oils, aromatic and silicon oils may be preferably used. As mentioned above, commercially available oils contain various additives incorporated therein. Oils contain ordinary lubricants and corrosion inhibitors incorporated therein in a proper amount may be used The oil which has heretofore been used as an additive for active material in the prior art negative plate to be formed in the tank is not used for the purpose of improving the thermal-runaway resistance as in the present invention but for the purpose of inhibiting the atmospheric oxidation of the negative active material (spongy metallic lead) after formation, rinsing and drying (vacuum drying).

Accordingly, the prior art doesn't involve the use of an oil as an additive for negative active material in the negative plate to be formed in battery container. The foregoing technique for tank formation has nothing to do with the present invention.

As mentioned above, the valve-regulated lead-acid battery according to the present invention produced by container formation method comprising an negative active material having an oil incorporated therein is little liable to thermal-runaway during float charging and thus can maintain stable battery properties for a prolonged period of time. Thus, the valve-regulated lead-acid battery according to the present invention is of great industrial value.

While the invention has been described in detail and with reference to specific embodiments thereof, it will be apparent to one skilled in the art that various changes and modifications can be made therein without departing from the spirit and scope thereof.

What is claimed is:

1. A valve-regulated lead-acid battery produced by a container formation method comprising the steps of: preparing a battery from unformed positive and negative plates, filling dilute sulfuric acid into said battery, and then applying an electric current to said battery so that the group of plates is formed in a battery case;

said valve-regulated lead-acid battery comprising an negative active material containing an oil incorporated therein wherein the amount of said oil is in the range of 0.05–1 percent by weight.

2. A valve-regulated lead-acid battery according to claim 1, wherein said oil is at least one of a paraffinic oil, naphthenic oil, olefinic oil, aromatic oil and silicon-based oil.

* * * * *